United States Patent [19]

Seibert et al.

[11] Patent Number: 4,753,069
[45] Date of Patent: Jun. 28, 1988

[54] MASTER CYLINDER, IN PARTICULAR FOR A BRAKE SLIP CONTROL APPARATUS FED WITH AUXILIARY ENERGY

[75] Inventors: Wolfram Seibert, Pfungstadt; Norbert Ocvirk, Offenbach, both of Fed. Rep. of Germany

[73] Assignee: Alfred Teves GmbH, Frankfurt am Main, Fed. Rep. of Germany

[21] Appl. No.: 908,627

[22] Filed: Sep. 18, 1986

[30] Foreign Application Priority Data

Aug. 18, 1986 [DE] Fed. Rep. of Germany ....... 3533254

[51] Int. Cl.$^4$ ................................................ B60T 8/32
[52] U.S. Cl. ...................................... 60/591; 303/114; 303/115; 303/119
[58] Field of Search .................. 60/591, 574, 553, 595; 303/114, 119, 113, 115

[56] References Cited

U.S. PATENT DOCUMENTS 4,634,190  1/1987  Wupper .............................. 303/114
4,641,891  2/1987  Belart ............................... 303/114 X Primary Examiner—Alan Cohan
Attorney, Agent, or Firm—James B. Raden; Robert P. Seitter

[57] ABSTRACT

A master cylinder for a vehicle hydraulic brake system having slip control is disclosed including a master cylinder piston in a bore defining a prechamber connected to an auxiliary fluid energy supply and a working chamber. A tube like projection on the master cylinder piston extends through a one-way sleeve seal into the working chamber. Auxiliary fluid is dynamically supplied from the prechamber past the one way sleeve seal into the working chamber and to the wheel brakes during slip control.

6 Claims, 1 Drawing Sheet

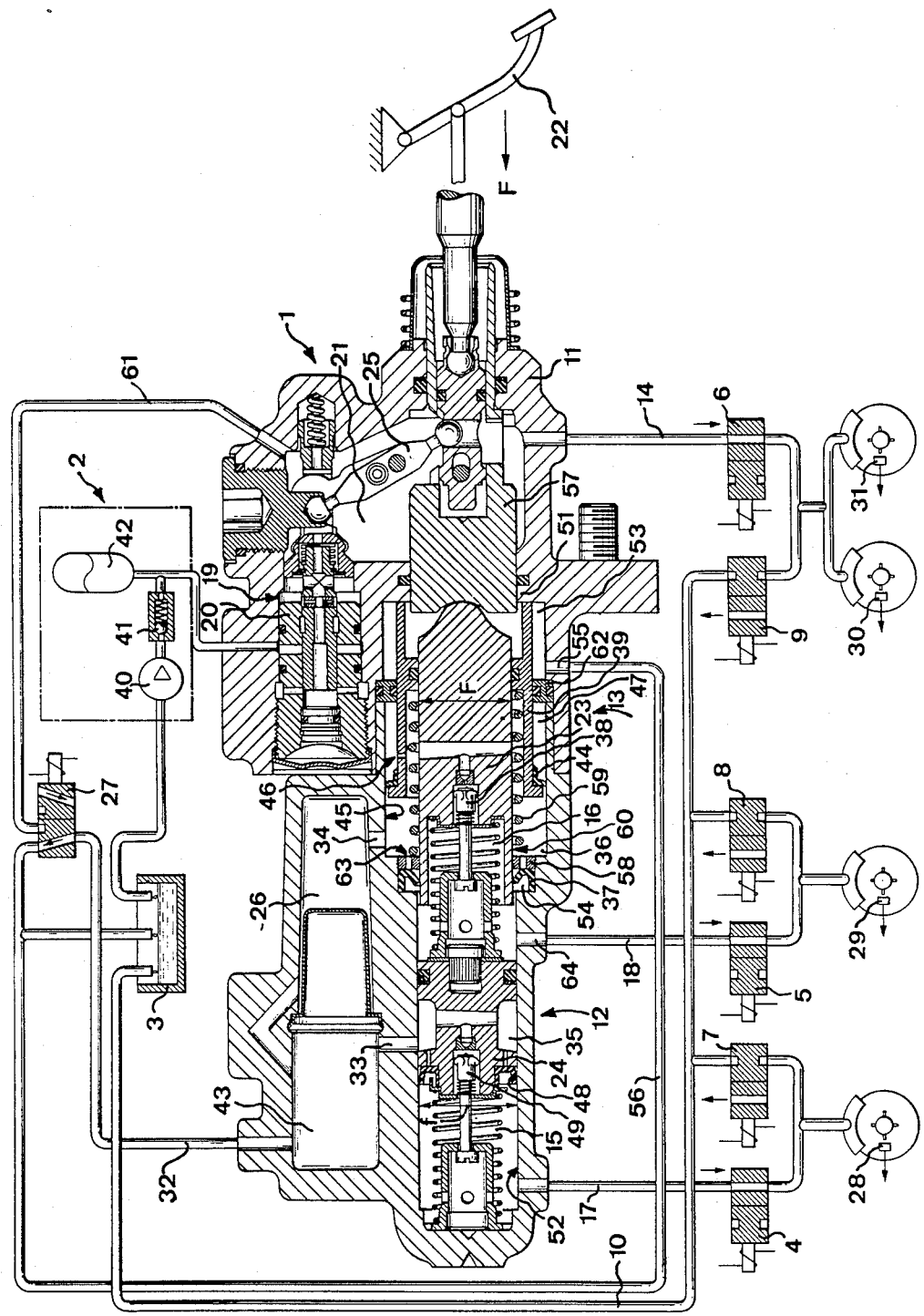

MASTER CYLINDER, IN PARTICULAR FOR A BRAKE SLIP CONTROL APPARATUS FED WITH AUXILIARY ENERGY

The present invention relates to a master cylinder, and in particular to a master cylinder for a brake slip control apparatus of a hydraulic vehicular brake system of the type operated by an auxiliary energy supply and having a master cylinder piston actuable by the brake pedal and including a prechamber and a supply bore for the delivery of auxiliary energy into the working chamber of the master cylinder.

A tandem master cylinder for a vehicular brake system is disclosed in European Pat. No. 0045232 wherein sealing sleeves for sealing two master cylinder pistons which are slidably accommodated in the master cylinder bore are arranged in annular grooves and disposed in the wall of the master cylinder bore, and the push-rod piston is provided at its end remote from the brake pedal with a tube-shaped portion which cooperates with a supply bore. According to this structure, upon brake application, the tube-shaped portion of the master cylinder piston will first override the supply bore and close it entirely. Upon commencement of pressure build up, the tube-shaped portion will have been displaced in the direction of actuation to an extent such that a sealing sleeve adjacent to the supply bore tightly bears against the cylindrical outer surface of the piston and prevents reverse flow of pressure fluid from the working chamber in front of the master cylinder piston to the supply reservoir. This known master cylinder, however, is not suited for use with a brake slip control apparatus operated by auxiliary energy supply since it does not provide for replenishment of fluid under higher pressure into the working chamber during the braking action.

SUMMARY OF THE INVENTION

It is therefore an object of the present invention to provide for a master cylinder which is adapted for use in a brake slip control apparatus and which does not suffer from the noted shortcomings of the known master cylinder. In addition, it is desirable to maintain the overall length of the master cylinder assembly, including the prechamber and positioning device, relatively small. Also, it is an object of the invention to provide for a master cylinder assembly that provides for rapid supply of large quantities of pressure fluid from the prechamber into the working chamber without requiring a complicated valve assembly.

These objects are achieved according to the present invention wherein there is provided an inwardly directed sleeve seal which annularly embraces the master cylinder piston and which is retained in the master cylinder housing.

According to the invention, the master cylinder piston includes a tube-shaped piston which extends from the master cylinder piston on the working chamber side thereof. The tube shaped portion cooperates with the sleeve seal and the diameter of the master cylinder piston is dimensioned so as to allow fluid circulation around that portion of the master cylinder piston that is disposed on the side of the sleeve seal remote from the brake pedal.

According to a preferred embodiment, the sleeve seal is held in a recess or an annular groove which is provided at the end of the master cylinder bore and, according to an important aspect of the invention, there is provided on the pedal side of the sleeve seal recess a bore of larger diameter than the sleeve seal recess which adjoins to the master cylinder bore and with the master cylinder piston forms an annular-cylindrical prechamber through which the pressure fluid is introduced into the working chamber.

Advantageously, a positioning tube is longitudinally slidably supported on the portion of the master cylinder piston which extends into the prechamber. A lip seal on the positioning tube is in sealing abutment with the bore defining the prechamber.

To ensure that the positioning tube remains in an inactive position when the brakes are released, the positioning tube is acted upon by a compression spring which surrounds the master cylinder piston and has its ends supported by the positioning tube and by a ring which is threadedly engaged in sleeve seal recess on the pedal side of the sleeve seal.

According to the preferred embodiment, the sleeve seal which sealingly surrounds the master cylinder piston is abutted by the threaded ring which includes apertures or bores which allow pressure fluid to flow from the prechamber past the sealing lip of the sleeve seal into the working chamber.

Advantageously, a radially inwardly extending collar or flange is provided in the large diameter bore which defines a central opening for guiding the cylindrical part of the positioning tube, thereby forming an annular chamber between the flange and a head portion of the positioning tube, which sealingly engages the large diameter bore by way of a sliding sealing sleeve.

The large diameter bore confining the positioning tube, the radially inwardly extending flange, pedal side end of the master cylinder and a booster portion form a chamber which by way of a port in the housing and a pressure line communicates with the return reservoir or the main valve which supplies pressure fluid into the working chambers of the master cylinder.

BRIEF DESCRIPTION OF THE DRAWING

The invention will be better understood after reading the following Detailed Description of the Preferred Embodiment in conjunction with the drawing which is a partial cross sectional and schematic representation showing details of construction and operation of a master cylinder and brake system embodying the principles of the invention.

DETAILED DESCRIPTION OF THE PREFERRED EMBODIMENT

As shown in the drawing, the inventive brake system includes a pedal-actuated elongated hydraulic braking pressure generator which, in general, is designated by reference numeral 1, an auxiliary-pressure source 2, a supply and pressure compensating reservoir 3 and electromagnetically actuable two-way/two-postion directional control valves 4, 5, 6, by way of which respectively the front and rear wheel brakes are connected to three hydraulically isolated brake circuits. Valves 4, 5, and 6 are normally open and not electrically excited. A return line 10 leads from the front and the rear brakes to the compensating reservoir 3, which return line, however, is isolated from the wheel brake cylinders by means of three additional two-way/two-position directional control valves 7, 8, 9 as long as they remain electrically unexcited.

The braking pressure generator 1 includes a hydraulic brake power booster 11, a master cylinder assembly 12 and a positioning device 13.

The rear-wheel brake circuit 14 is connected directly to the brake power booster 11 while the two working chambers 15 and 16 of the master cylinder assembly 12, which is herein designed as tandem master cylinder, are connected respectively to one front wheel brake by way of separate brake circuits 17 and 18. The two master cylinder circuits 17 and 18 are static pressure-fluid circuits, while the rear brake circuit 14 is a dynamic pressure-fluid circuit because, in this circuit 14, the pressure is defined by the position of a control valve 19 which is pedal-actuated through rod 25 and which, depending on the displacement of a valve piston 20, allows more or less pressure out of the auxiliary-energy source 2 to enter into the booster chamber 21 and from there into the brake circuit 14.

The pressure built up in the booster chamber 21 on depression of a brake pedal 22 and introduced through the control valve 19 acts on the pistons 23, 24 of the master cylinder assembly 12 simultaneously which thereby develops braking pressure in the working chambers 15 and 16 of the two static brake circuits 17, 18 which lead to the front wheel brakes. Initially, atmospheric pressure prevails in the filling chambers 26, 43 of the master cylinder assembly 12 because these chambers are in communication with the pressure-compensating reservoir 3 by way of a pressure-fluid conduit 32 and an electromechanically operated main valve 27 when in an inactive position, that is, when the valve 27 is not electrically excited.

At each wheel of the vehicle equipped with the inventive brake system, there is arranged a sensor 28, 29, 30, 31 which is designed, e.g. as an inductive pick-up, for measuring data and which feeds information about the wheel rotational behavior into an electronic control unit not shown. This control unit contains, among other things, an electronic combining logic in the form of hard-wired or programmed circuitries, such a microprocessors, and after evaluation of the sensor signals, generates electrical control commands which are delivered to the corresponding solenoid valves 4, 5, 6, 7, 8, 9 and 27.

Upon commencement of brake slip control, that is when one or more of the wheels is about to lock up, the main valve 27 changes over from the position shown in the drawing and connects to line 61 leading to chamber 21. This connects pressure-fluid conduit 61 leading from the booster chamber 21 to the filling chambers 26, 43 by way of line 32 so that pressure fluid flows into the filling chambers 26, 43. This pressure is supplied further through connecting channels 33, 34 to a pair of prechambers 35, 36 inside the master cylinder assembly 12. From these prechambers 35, 36, pressure fluid propagates through the sleeve seals 37, 48 arranged at the periphery of the pistons 23, 24 and which function as non-return valves, through the valves 38, 49 and is introduced dynamically into the working chambers 15, 16 which, as noted, are in communication with the wheel brakes of the front wheels.

The dynamically introduced pressure simultaneously results in resetting of a positioning tube 39 of the positioning device 13, whereby the pistons 23, 24 in the master cylinder assembly 12 and, the brake pedal 22 will assume a predetermined position.

Due to the dynamic introduction of pressure fluid into the static brake circuits 17, 18 of the front wheels and into the prechamber 36, which is of critical importance for the resetting pressure exerted on the positioning tube 39, depletion of fluid from the working chambers 15 and 16 is avoided. Depletion is avoided even in the event of frequent and long durations of pressure decrease, caused by discharge of pressure fluid from the circuits 17, 18, by way of the valves 7 and 8 which are actuated during slip control.

The positioning tube 39 is sealed in relation to the bore 45 by means of a one-way lip seal 44 at the head of the tube and includes a throttle bore 46 through which the pressure fluid which entered the annular gap 47 past the lip seal 44 is allowed to flow back to the prechamber 36. When in its inactive position, the positioning tube 39 abuts on a collar 51 of the booster housing. The annular chamber 53 communicates via a port 55, a pressure-fluid conduit 56 and the valve 27 and line 32 with the filling chamber 43.

When the prechamber 36 is acted upon by pressure fluid subject to controlled pressure during brake slip control, as noted above, the higher pressure prevailing in the prechamber 36 from that in chamber 53 will displace the positioning tube 39 in the direction of the brake pedal 22 until it abuts on the collar 51.

The master cylinder piston 23 is sealed in relation to the master cylinder bore 52 by means of the sleeve seal 37 which is retained in an annular recess or groove 54 in the master cyinder housing and is secured against axial displacement by a threaded ring 58. Supported on one side of the ring 58 is one end of a compression spring 59 which abuts at its other end on a bead of the positioning tube 39 and thereby urges the positioning tube against the collar 51. A comparatively short overall length of the braking pressure generator is achieved principally due to the sleeve seal 37 in that the sleeve seal is designed to seal in a radially inward direction and for that reason the master cylinder piston 23 is provided with a thin-walled tube-shaped portion 60 which extends the master cylinder piston 23 on the side thereof facing the working chamber. Due to this tube-shaped portion 60, the lip seal 37 can be positioned at a location shifted comparatively far in the direction toward the master cylinder piston 24 so that the prechamber 36 is positioned longitudinally up to the area of working chamber 16, thereby shortening the length of the entire assembly.

To facilitate the supply of pressure fluid out of the prechamber 36 past the ring 58 and through the bores 63 and past the non-return sealing sleeve 37, into the working chamber 16, the diameter F of the master cylinder piston 23 is dimensioned slightly less than the internal diameter f of the master cylinder bore 52. It is thereby likewise ensured that the connecting bore 64 to the brake circuit 28 will not be closed when the tube-shaped portion 60 of the master cylinder piston 23 overrides the bore 64.

Having described the preferred embodiment of the invention, it is understood that those skilled in the art, can readily devise other embodiments and modifications and that those other embodiments are to be considered to be within the scope of the appended claims.

What is claimed is:

1. A master cylinder for a vehicle hydraulic brake system having brake slip control of the type including an auxiliary fluid energy supply comprising, a master cylinder housing including a bore, a brake pedal actuable master cylinder piston in said bore defining a working chamber and a prechamber, said housing including a supply bore connected to said prechamber providing for supply of said auxiliary fluid to said prechamber during slip control, a one-way sleeve seal retained in said housing between said prechamber and said working chamber including a radially inward directed sealing surface sealingly surrounding a tube-like portion on a working chamber end of said master cylinder piston, said tube-like portion extending through said one-way sleeve seal, said one-way sleeve seal providing for dynamic introduction of said auxiliary fluid from said prechamber past said sealing surface into said working chamber during slip control, said tube-like extension portion of said master cylinder piston having a diameter less than the diameter of the bore defining said working chamber, and wherein said prechamber is provided as a cylindrical bore having a diameter greater than the diameter of the bore defining said working chamber.

2. A master cylinder as claimed in claim 1, wherein the one-way sleeve seal is retained in a recess provided in the master cylinder housing bore, said prechamber being on the brake pedal side of said one-way sleeve seal.

3. A master cylinder as claimed in claim 1 further comprising, an annular chamber defined by a positioning tube longitudinally slidably supported around the master cylinder piston in said prechamber, said positioning tube including a lip seal being in sealing abutment with the housing bore and a stationary, radially inwardly extending annular collar-like flange in said housing bore between said housing and said positioning tube.

4. A master cylinder as claimed in claim 3, further including a compression spring surrounding the master cylinder piston and supported on one end by a ring in said recess against the one-way sleeve seal said spring supported on a second end by said positioning tube piston.

5. A master cylinder as claimed in claim 3, wherein the radially inwardly extending collar-like flange sealingly engages said positioning tube at an intermediate position on said tube and the housing bore, the radially inwardly extending flange, a booster chamber end of said housing including a booster piston extending into said housing bore, and an end of said master cylinder piston opposite said working chamber end thereof form a chamber including a port adapted to be selectively connected to a fluid return reservoir, and valve means for supplying said auxiliary pressure fluid to the prechamber of the master cylinder.

6. A master cylinder as claimed in claim 4, wherein the ring includes apertures which permit flow of said auxiliary pressure fluid out of the prechamber, through said apertures, past said sealing lip of the one-way sleeve seal and into the working chamber.

* * * * *